No. 616,062. Patented Dec. 13, 1898.
T. MORGAN & F. W. JONES.
BOX COVERING AND CORNER STAYING MACHINE.
(Application filed Oct. 27, 1897.)
(No Model.) 4 Sheets—Sheet 1.
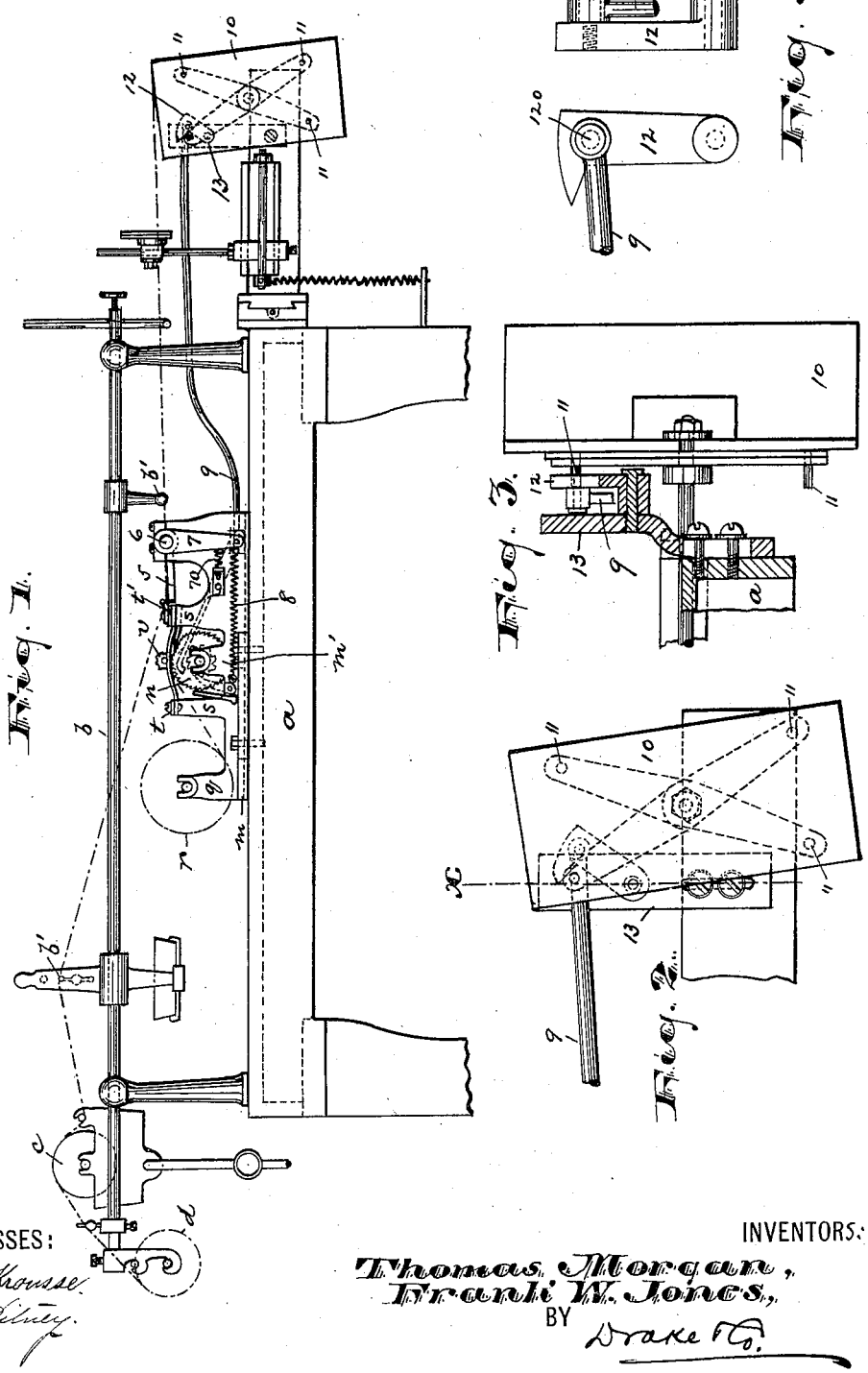
WITNESSES:
INVENTORS:
Thomas Morgan,
Frank W. Jones,
BY Drake & Co.
ATTORNEYS.

No. 616,062. Patented Dec. 13, 1898.
T. MORGAN & F. W. JONES.
BOX COVERING AND CORNER STAYING MACHINE.
(Application filed Oct. 27, 1897.)
(No Model.) 4 Sheets—Sheet 2.
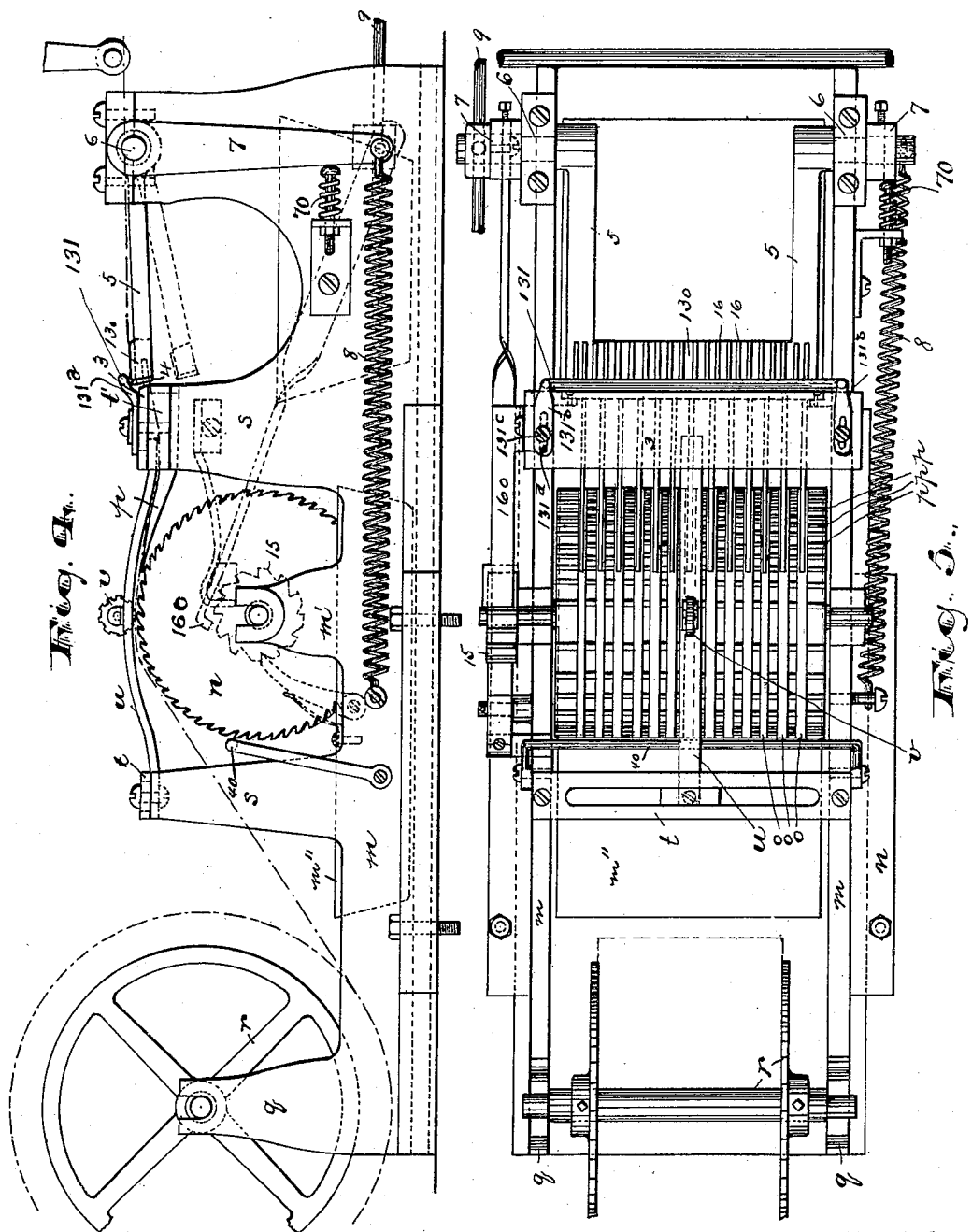
WITNESSES:
INVENTORS.
Thomas Morgan,
Frank W. Jones,
BY
ATTORNEYS.

No. 616,062. Patented Dec. 13, 1898.
T. MORGAN & F. W. JONES.
BOX COVERING AND CORNER STAYING MACHINE.
(Application filed Oct. 27, 1897.)

(No Model.) 4 Sheets—Sheet 3.

WITNESSES:
A. R. Krause
C. B. Pitney

INVENTORS.
Thomas Morgan,
Frank W. Jones,
BY
Drake G.
ATTORNEYS.

No. 616,062. Patented Dec. 13, 1898.
T. MORGAN & F. W. JONES.
BOX COVERING AND CORNER STAYING MACHINE.
(Application filed Oct. 27, 1897.)

(No Model.) 4 Sheets—Sheet 4.

WITNESSES: INVENTORS:
A. R. Krousse Thomas Morgan,
C. B. Pitney Frank W. Jones,
BY Drake & Co.
ATTORNEYS

THE NORRIS PETERS CO., PHOTO-LITHO., WASHINGTON, D. C.

UNITED STATES PATENT OFFICE.

THOMAS MORGAN, OF JERSEY CITY, AND FRANK W. JONES, OF NEWARK, NEW JERSEY; SAID MORGAN ASSIGNOR TO CLARENCE W. HOBBS, OF WORCESTER, MASSACHUSETTS.

BOX-COVERING AND CORNER-STAYING MACHINE.

SPECIFICATION forming part of Letters Patent No. 616,062, dated December 13, 1898.

Application filed October 27, 1897. Serial No. 656,499. (No model.)

*To all whom it may concern:*

Be it known that we, THOMAS MORGAN, residing at Jersey City, Hudson county, and FRANK W. JONES, residing at Newark, in the county of Essex, in the State of New Jersey, citizens of the United States, have invented certain new and useful Improvements in Box-Covering Machines and Corner-Staying Attachments Therefor; and we do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

The objects of this invention are to reduce the cost of manufacturing paper boxes, to secure a stronger box, to dispense with certain independent operations and thereby facilitate the manufacture of the box, and to secure other advantages and results, some of which may be referred to hereinafter in connection with the description of the working parts.

The invention consists in the covering or stripping and staying machine for box-manufacturing, and in the combinations and arrangements of parts thereof, and in the process of manufacturing paper boxes, all substantially as will be hereinafter set forth, and finally embraced in the clauses of the claim.

Figure 6:
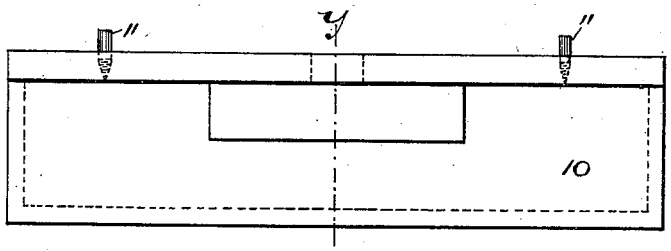
Figure 7:
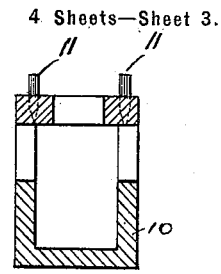
Figure 8:
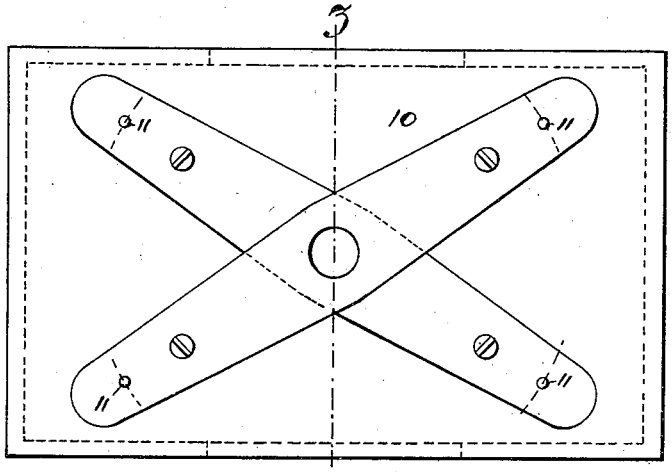
Figure 9:
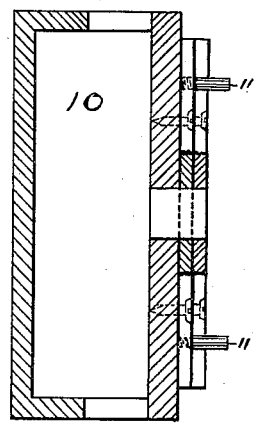
Figure 10:
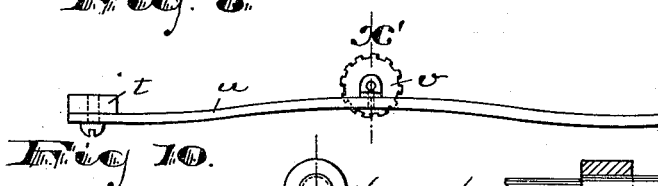
Figure 11:
Figure 12:
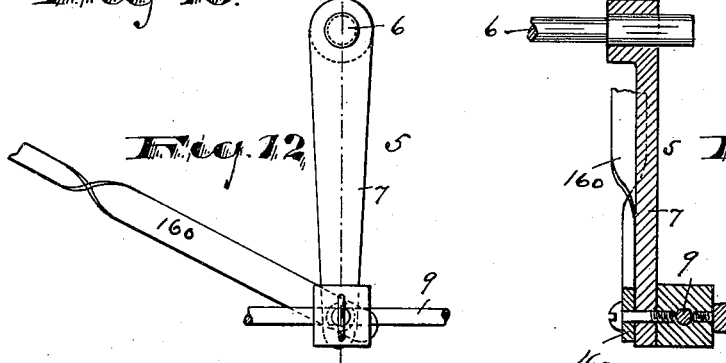
Figure 13:
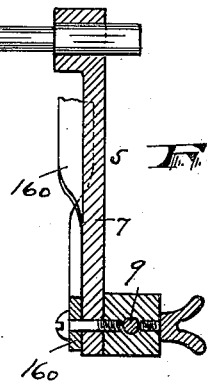
Figure 15:
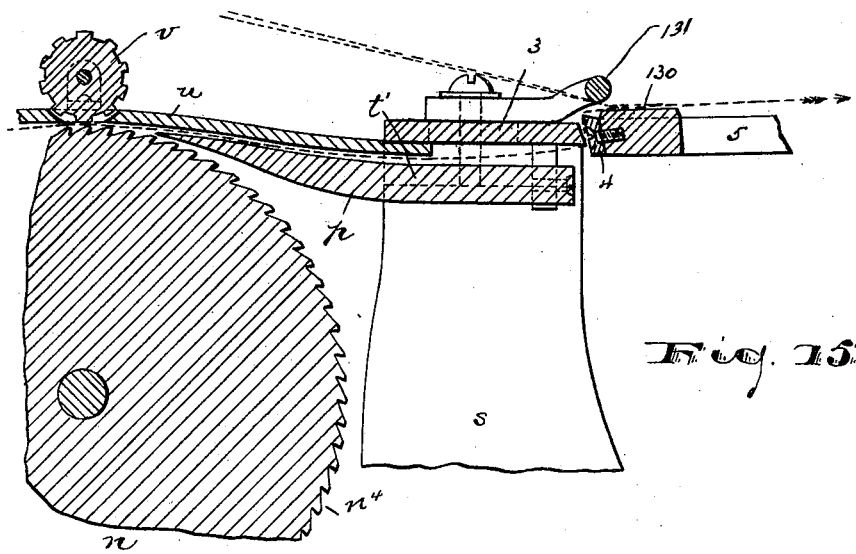
Figure 14:
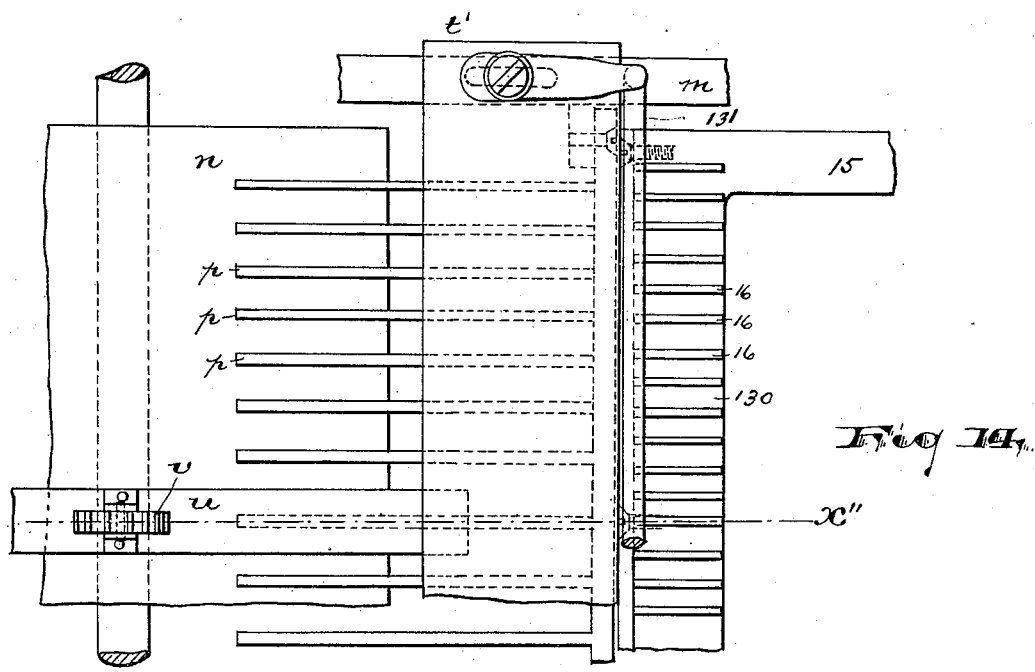

Referring to the accompanying drawings, in which like letters and figures of reference indicate corresponding parts in each of the several views, Figure 1 is a side elevation of a portion of our covering and staying machine, showing the staying devices and their relation to the ordinary covering or "stripping" mechanisms. Fig. 2 is a side view of a rotary form on which the box is placed in the act of covering, said Fig. 2 showing certain tripping-pins and coöperating parts for operating the stay cutting and applying devices. Fig. 3 is a sectional view of the same, taken on line $x$, Fig. 2. Fig. 3ª shows a side view and plan of a certain trip-rod connection. Fig. 4 is a side view of the stay cutting and applying device. Fig. 5 is a plan of the same. Fig. 6 is a detail side view of a rotary form, showing the tripping-pins. Fig. 7 is a section of the same, taken on line $y$. Fig. 8 is a plan of said form, showing a preferred method of attaching or arranging the tripping-pins. Fig. 9 is a section of the same on line $z$. Fig. 10 is a side view in detail of a pressure-roll adapted to work in connection with the stay-forwarding cylinder. Fig. 11 is a section of the same on line $x'$. Fig. 12 is a detail side view of a certain oscillating arm showing its connection with a cylinder-operating dog and a trip-rod adapted to be moved longitudinally by the trip-pins of the form. Fig. 13 is a sectional view of the same, showing more clearly the means permitting an adjustment of the trip-rod in its relation to the oscillating arm and dog. Fig. 14 is a detail plan of the devices for applying glue to the stay-strips and feeding the said stay-strips forward to the cutter, and Fig. 15 is a section of the same on line $x''$.

Heretofore in the manufacture of paper boxes it has been common to apply the corner-stays, usually of short pieces of paper, muslin, or other fabric, to the box prior to covering said box with the outer corner-covers, the blank box being bent to the proper box-like shape and then placed in a staying-machine, if within certain sizes, by which the stays were applied. Often said stays have been applied by hand. Said stays when applied by the special staying-machine have generally, if not always, terminated at the upper edge of the box and have not extended around the edges and into the box, so as to give the greater strength. The staying operation, therefore, required the expenditure of considerable time and handling and entailed a cost ranging from, say, thirty cents to two dollars a thousand pieces.

In our improvement the stays are applied while covering or stripping the box, the stays being cut, prepared, and applied to the "strip" or covering-paper, so that when said covering-paper is applied to the box said stays will also be applied and will lie over or around the corners to stay the same, the stays being applied automatically or without additional operations by the attendant and being turned over the edges of the box by hand with the covering.

In said drawings, $a$, Fig. 1, indicates a suitable bed-plate, table, or frame, on which are elevated tracks $b$, arranged longitudinally above the opposite sides of said table, on which certain transverse cover guiding or supporting rods $b'$ and other parts have their bearings, as in the covering-machines common in the market. At one end of said table are stationed the glue-roller $c$ and adjustable scraper for removing the surplus glue, the reels $d$ for the rolls of paper or covering material, means for heating the glue, and the other appliances common in covering or stripping machines, and at the opposite end of said table is the rotary form 10, on which the box to be covered is placed and to which the glued paper is drawn over the transverse guides or supports while being "tempered," all as will be understood by one skilled in the art.

In our improvements we arrange on the table $a$, between the gluing-roll $c$ and the form 10, the stay cutting and applying devices adapted to apply glue to the stay-strip, or, if said strip is already glued, to dampen said strip and then to cut the stays from the stay-strips, and when said stays are properly tempered to so apply said stay-strips to the glued under side of the covering-strips that the glued under side of the covering-strip and the glued side of the stays will be applied to the box, the said stays being first glued to the under side of the covering. The said stays are cut from the stay-strip and are applied to the covering-strip while the latter is being fed forward from the reel $d$ to the form. The stays are so applied to the covering as to cause them to lie at proper positions at the corners of the box when said covering is placed by the attendant. To secure such an arrangement of the stays, we employ the machine attachment shown more in detail in Figs. 4, 5, 14, and 15, where $m$ is a supporting plate or frame adapted to be adjustably seated upon the table $a$ and having bearings $m'$ for a glue-roll $n$, the circumferential surfaces of which are milled or roughened, as at $n^4$, Fig. 15, to secure a proper frictional contact with the paper, and are circumferentially grooved, as at $o\ o$, Fig. 5, to receive the ends of the "take-up" fingers $p$, said finger ends being sunken in said circumferential grooves beneath the roughened surface of the roll, so that they will pass beneath the paper or material of the stay-strip and raise the same from the roll that said strip will pass forward to the cutter. The lower side of the roll $n$ lies or extends into a glue-pan $m''$ beneath. The said bed plate or frame $m$ is also provided with raised bearings $q\ q$ for the stay-strip reel $r$, from which the uncut stay-strip is fed. It is also provided with bearings $s\ s$, which are bridged, as at $t\ t'$, the bridges affording bearings for a spring or springs $u$ for a presser-roll $v$, arranged in a slot in said spring for holding the stay-strip down to the gluing-cylinder and compelling said gluing-cylinder to effectually forward the stay-strip to the cutter without slipping. The spring $u$ also serves as a guide or keeper for the strip, preventing the same from rolling or buckling up in its forward passage. Said spring $u$ is adjustable laterally, the bridge $t$ being longitudinally slotted and provided with a suitable screw or clamp to hold the said spring in position. The bridge $t'$ has the stripping-fingers $p$ projecting therefrom, which fingers may be soldered or riveted upon said bridge or be integral therewith. Above said bridge $t'$ is fastened a stationary knife or cutter 3, (shown more clearly in Fig. 15,) beneath which the stay-strip is forced forward by the roll $n$. Co-operating with said knife or cutter 3 is a shearing-knife 4, which is carried by a lever 5, fulcrumed at 6 6 and having arms 7 7 at opposite sides of the attachment, one to receive the spring 8, by which the shearing of the stay-strip is effected, and the other to receive the cutter-operating or trip rod 9, which extends forward to be operated by the rotary form 10, having the trip-pins 11.

The forward end of the trip-rod 9 is pivoted at 120, Fig. 3$^a$, to the hooked catch 12, near the hooked end thereof, and said catch is in turn pivoted near one end of the form upon the bracket or support 13, attached to the bed-plate $a$. When said form is turned in the act of covering the box on said form, the pins 11 on said form catch upon the hooked end of the catch 12 and draw said hooked catch pivotally and the rod 9 longitudinally. The lever 5 is thus turned on its fulcrum 6 against the power of the spring 8, and the shearing-blade 4 is forced downward a limited distance and is then released. This release is accomplished by the trip-pin 11 slipping from the hooked catch as the form 10 is turned. The spring 8 becomes free to act on said lever 5 and raise the shearing-cutter with sufficient force to sever the stay from the strip. The shearing-cutter presents a broad tablet 130 to receive the severed stay and press it up against the gummed under face of the covering-strip, so that said stay is fastened beneath said covering-strip and travels forward with it to the box on the form 10. The pins 11 on the form 10 are disposed and timed to cut and apply the stays to the covering-strip at distances equal to the distances of the box-corners from one another, so that as the covering is applied said stays will be over the corners of the box without any care on the part of the operator.

The feeding and glue-applying roll $n$ is given an intermitting or step-by-step motion to effect a proper feeding of the stay-strip by a ratchet-wheel 15 and pawl 160, the latter being in connection with one of the arms 7, so that as the shearing-cutter is lowered preliminary to cutting the roll $n$ is turned to forward the stay-strip and cause it to pass over onto the tablet. Said tablet is provided with ribs or lifts 16 16 to hold the stay-strip up into proper engagement with the under side of the cover-strip.

A scraper 40 serves to remove the surplus glue from the roll $n$. It consists, preferably, of a ⌐¬-shaped piece pivoted at its downwardly-extending extremities upon the sides of the plate or frame $m$ and at its horizontal part bearing upon the periphery of the roll to scrape away the surplus liquid, which drops back into the glue-pan $m''$ beneath.

The spring 8, acting on the levers 7 and 5, tends to throw the cutters when released into cutting engagement, the cutting movement being cushioned by the spring-buffer 70, by which the ribbed tablet 130 after pressing the severed stay against the under side of the covering-strip is thrown back from the applied stay a quarter of an inch, more or less, to permit a free forward movement of said covering-strip. The covering-strip is held down in position to receive the severed stay by a transverse rod 131, similar to the guiding or supporting rods $b'$, previously mentioned, said rod being disposed a little above the level of the knife or cutter 3 and parallel thereto. This rod 131 is at its opposite ends supported by arms $131^a$, which project forwardly and upwardly from the cutter-plate 3. The rod is preferably integral with said arms, but may be secured thereto in any suitable manner. Each rod-supporting arm has a foot $131^b$, which rests upon the cutter-plate 3 and is fastened in place by a screw or bolt $131^c$, the foot being longitudinally slotted at $131^d$ to receive said screw or bolt and allow the adjustment of the rod 131 with reference to the cutter-plate.

In operation the pins 11 on the form 10 as the latter is turned by the operator draw the rod 9 toward the operator against the power of the spring 8 until said rod is released, when said spring 8 is free to force the lever knife or cutter 4 and its tablet 130 upward, severing the stay-strip previously forwarded by the ratchet and pawl 15 160. The severed stay is immediately lifted by the tablet of the knife 4 and applied to the gummed under surface of the covering, the stay-strip being also supplied with wet gum or cement, so that after the application of the stay the under side of said covering-strip and the stay thereon will present a continuous cemented surface to the box. Immediately after applying the stay the tablet is withdrawn by the spring-buffer 70 to permit the continued movement of the covering-strip, as will be understood.

Having thus described the invention, what we claim as new is—

1. The combination with a box-covering machine having means for feeding forward the covering-strip and applying glue thereto and a form to receive the box, of a stay attachment having means to receive the stay-strip, apply glue thereto, to sever the stay from the strip, and apply it to the cover, and means for operating said parts, substantially as set forth.

2. The combination with the box-covering machine and means for feeding the covering-strip, applying the glue thereto, and a rotary form for receiving the box and drawing said strip forward onto said box, of a stay attachment for cutting stays and applying them to the covering-strip automatically as said covering-strip is drawn forward by said form, substantially as set forth.

3. The combination with the box-covering machine having a rotary form and covering-strip feeding and cementing appliances, of stay-strip feeding and cementing means, cutters for severing the stays from the stay-strip and tripping means and connections operated by the form and operating said cutters to forward the stay-strip, sever the stays and press the severed stays against the covering-strip, substantially as set forth.

4. The combination with the box-covering machine having a rotary form with tripping means, of a stay attachment having means, operated by said tripping means, for cutting the stays and applying them to the under side of the covering-strip, preliminary to applying the latter to the box, substantially as set forth.

5. In combination with the rotary form of a box-covering machine, a stay attachment having a glue-roll, cutters, a ratchet and pawl for operating the glue-roll, and means operated by the form for operating the cutters and ratchet and pawl, substantially as set forth.

6. In combination with the plate $m$, a glue-roller having a longitudinally milled or roughened surface and circumferential grooves in its periphery, stripping-fingers extending into the circumferential grooves, a fixed cutter and a lever having a shearing-cutter, a spring 8, and means for operating said lever against the power of said spring, substantially as set forth.

7. In combination with the plate $m$, having bridges $t$, $t'$, a glue-roll $n$, a presser-roll $v$, ratchet and pawl for operating said glue-roll, a fixed cutter, a lever, one arm of which carries a coöperating cutter, a spring for effecting a cutting engagement and means for operating said parts, substantially as set forth.

8. In combination with the covering mechanisms of a paper-box machine, a stay attachment, comprising a grooved glue-roll, a presser-roll, a ratchet and pawl, a fixed cutter, a lever having a coöperating cutter and means for operating said cutters and ratchet and pawl, substantially as set forth.

9. In a box covering and staying machine, the combination with the box-form, the covering-strip feeding and forwarding devices, stay-strip feeding and forwarding means, and stay-strip-severing cutters, comprising a fixed knife and a movable knife having a tablet, and means for operating said knife and raising the tablet whereby the severed stay will be presented to the covering-strips, substantially as set forth.

10. In a box covering and staying machine, the combination with the covering-strip feeding and forwarding devices, the stay-strip feeding and forwarding devices, and the box-form and connections, of a lever carrying the ribbed tablet and cutter, and a fixed cutter, all arranged and adapted to operate substantially as set forth.

11. In a box covering and staying machine, the combination with the covering-strip feeding and forwarding devices, the stay-strip feeding and forwarding devices, and the rotary box-form having trip-pins or projections, of the transverse bar 131, for holding the covering-strip, the fixed knife, the movable knife and its tablet, and operating means, all combined, substantially as set forth.

In testimony that we claim the foregoing we have hereunto set our hands this 16th day of August, 1897.

THOMAS MORGAN.
FRANK W. JONES.

Witnesses:
CHARLES H. PELL,
C. B. PITNEY.